UNITED STATES PATENT OFFICE.

URI LEE, OF BURLINGTON, MICHIGAN.

COMPOSITION FOR MIXING WITH PAINTS.

Specification forming part of Letters Patent No. 26,685, dated January 3, 1860.

*To all whom it may concern:*

Be it known that I, URI LEE, of Burlington, in the county of Calhoun and State of Michigan, have invented or discovered a new and useful Composition or Paint-Vehicle; and I do hereby declare that the same is described and represented in the following specification.

To enable others skilled in the art to make and use my new invention or discovery of paint-vehicle, I proceed to describe the best mode known to me for compounding and preparing the same.

The nature of my invention or discovery consists of a composition which I will now describe as follows, to wit:

I put two gallons of rain or soft water in a vessel and add six ounces of sal-soda and three ounces of borax and heat the water until the sal-soda and borax are dissolved, and then add one gallon of linseed-oil and stir the whole until it is thoroughly compounded. If more convenient, the oil may be added after the other ingredients have cooled. This composition is now ready to receive any pigment, or such pigments as will make the color desired, and is well suited to indoor and outdoor painting; but for outdoor painting I prefer to use five ounces of the sal-soda and one pound of brown bar-soap, as it makes the paint thicker and gives it a better body. The common pigments or paints of commerce may be mixed with this vehicle either when in the dry state or after they are ground in oil and applied to great advantage.

When paints are mixed with the above-described composition or vehicle and applied to wood the alkaline solution or watery part is more readily and quickly absorbed by the wood than the oily part, so as to retard the absorption of the oil, which is held at or retained on the surface of the wood, so as to form a thicker, more solid, permanent, and stronger coat of paint than if oil only was used. A remarkable peculiarity of this paint is it dries or becomes hard first next to the wood and afterward on the surface and forms a coat of paint which resists fire far better than paint mixed with oil only.

From experiments which I have made I am satisfied that paint applied with this composition or vehicle is more durable when exposed to the changes of the weather than paint mixed with oil only. Besides, this composition is sixty per cent. cheaper than oil. I contemplate that some other alkaline salt or salts may be substituted for the sal-soda, although I consider the sal-soda the cheapest and best so far as I have made experiments in this matter.

I believe I have described the ingredients and the mode of compounding them to form my new composition or paint-vehicle so as to enable any person skilled in the art to make and use it. I will now state what I desire to secure by Letters Patent, to wit:

What I claim as my invention or discovery is—

The above-described composition or paint-vehicle, mixed or compounded in the propotions stated.

URI LEE.

Witnesses:
J. DENNIS, Jr.,
J. F. CALLAN.